United States Patent
Arunkumar et al.

(10) Patent No.: US 11,960,399 B2
(45) Date of Patent: Apr. 16, 2024

(54) RELAXED INVALIDATION FOR CACHE COHERENCE

(71) Applicant: ADVANCED MICRO DEVICES, INC., Santa Clara, CA (US)

(72) Inventors: Akhil Arunkumar, Santa Clara, CA (US); Tarun Nakra, Austin, TX (US); Maxim V. Kazakov, San Diego, CA (US); Milind N. Nemlekar, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/558,034

(22) Filed: Dec. 21, 2021

(65) Prior Publication Data

US 2023/0195628 A1 Jun. 22, 2023

(51) Int. Cl.
*G06F 12/0811* (2016.01)
*G06F 12/0853* (2016.01)
*G06F 13/16* (2006.01)

(52) U.S. Cl.
CPC ...... *G06F 12/0811* (2013.01); *G06F 12/0853* (2013.01); *G06F 13/1642* (2013.01); *G06F 13/1668* (2013.01)

(58) Field of Classification Search
None
See application file for complete search history.

(56) References Cited

U.S. PATENT DOCUMENTS

| 6,018,763 | A | * | 1/2000 | Hughes | H04L 49/901 709/213 |
| 10,073,776 | B2 | | 9/2018 | Srinivasan et al. | |
| 2012/0233410 | A1 | * | 9/2012 | Fu | G06F 12/0837 711/141 |
| 2015/0067266 | A1 | * | 3/2015 | Jafri | G06F 12/0804 711/136 |

OTHER PUBLICATIONS

Hammond, Lance et al., "Transactional memory coherence and consistency," Proceedings. 31st Annual International Symposium on Computer Architecture, 2004., 2004, pp. 102-113, doi: 10.1109/ISCA.2004.1310767.
McDonald, Austen et al., "Characterization of TCC on Chip-Multiprocessors," Parallel Architectures and Compilation Techniques—Conference Proceedings, PACT, 2005: 63-74, DOI:10.1109/PACT.2005.11.

* cited by examiner

*Primary Examiner* — Charles J Choi

(57) ABSTRACT

Methods, systems, and devices maintain state information in a shadow tag memory for a plurality of cachelines in each of a plurality of private caches, with each of the private caches being associated with a corresponding one of multiple processing cores. One or more cache probes are generated based on a write operation associated with one or more cachelines of the plurality of cachelines, such that each of the cache probes is associated with cachelines of a particular private cache of the multiple private caches, the particular private cache being associated with an indicated processing core. Transmission of the cache probes to the particular private cache is prevented until, responsive to a scope acquire operation from the indicated processing core, the cache probes are released for transmission to the respectively associated cachelines in the particular private cache.

28 Claims, 4 Drawing Sheets

RELAXED INVALIDATION FOR CACHE COHERENCE

BACKGROUND

Processing systems typically utilize data caching to accelerate access to data stored in system memory. The data caching is implemented in the form of a cache hierarchy in which multiple levels of caches are used to temporarily store data accessed from the system memory. Coherency protocols often are implemented in such multiple level caches to ensure that a processing core does not operate on cached data that has become stale or otherwise invalid. However, conventional caching techniques often lead to excessive cache probe traffic for implementing the coherency protocols, and thus may impact caching performance.

BRIEF SUMMARY OF EMBODIMENTS

Embodiments are described herein in which state information is maintained in a shadow tag memory for a plurality of cachelines in each of multiple private caches, with each private cache being associated with a corresponding one of multiple processing cores. One or more cache probes are generated based on a write operation associated with one or more cachelines of the plurality of cachelines, such that each of the cache probes is associated with one or more cachelines (e.g., one or more cachelines targeted by the write operation) of a first of the multiple private caches that is associated with an indicated processing core. Transmission of the cache probes to the first private cache is prevented until, responsive to a scope acquire operation from the indicated processing core, the cache probes are released for transmission to the respectively associated cachelines in the first private cache.

In certain embodiments, a method may include receiving an indication of a write operation associated with a first private cache of a plurality of private caches, the first private cache associated with one processing core of a plurality of processing cores; and delaying notification of the write operation to any private caches of the plurality of private caches until a synchronization event occurs.

Delaying notification of the write operation until the synchronization event occurs may include delaying notification of the write operation until a scope acquire operation is received from the one processing core.

The method may further include, responsive to receiving the synchronization event, resetting a stale indicator bit for the first private cache.

The method may further include providing, responsive to the synchronization event and for transmission to one or more cachelines of a plurality of cachelines in each of at least one of the private caches, one or more cache probes indicating the write operation. Providing the one or more cache probes for transmission may include generating the cache probes in response to the synchronization event. Providing the one or more cache probes for transmission may include generating the cache probes in response to the write operation. Providing the one or more cache probes for transmission may include providing the one or more cache probes in a queued order.

The method may further include maintaining, in a shadow tag memory, state information for a plurality of cachelines in each private cache of the plurality of private caches, each private cache being associated with a corresponding one of the plurality of processing cores. Maintaining the state information for the plurality of cachelines may include maintaining a respective bit vector for at least one private cache of the plurality of private caches, each of the respective bit vectors including an indication of whether the associated private cache may contain stale data. The method may further include setting, responsive to receiving a cacheline store operation for an identified cacheline, one or more modification indicator bits for the identified cacheline to indicate that the identified cacheline may contain stale data. The one or more modification indicator bits may be stored as part of state information in shadow tag entries corresponding to the plurality of cachelines. The method may further include setting, responsive to receiving a scope release operation from one processing core of the plurality of processing cores, setting one or more stale indicator bits to indicate that each private cache of the plurality of private caches may contain stale data.

The method may further include broadcasting the synchronization event to multiple memory channels of a shadow tag memory responsive to the synchronization event.

In certain embodiments, a processing system may include a plurality of processing cores and a plurality of private caches, each private cache associated with a corresponding processing core of the plurality of processing cores. The processing system may be configured to receive an indication of a write operation associated with a first private cache of the plurality of private caches, the first private cache associated with one processing core of the plurality of processing cores; and delay notification of the write operation to any private cache of the plurality of private caches until a synchronization event occurs.

The synchronization event may include a scope acquire operation received from the one processing core. The processing system may further be configured to, responsive to receiving the scope acquire operation, reset a stale indicator bit for the first private cache.

The processing system may further be configured to provide, responsive to the synchronization event and for transmission to one or more cachelines of a plurality of cachelines in each of at least one of the private caches, one or more cache probes regarding the write operation. To provide the one or more cache probes for transmission may include to generate the cache probes in response to the synchronization event. To provide the one or more cache probes for transmission may include to generate the cache probes in response to the write operation. To provide the one or more cache probes for transmission may include to provide the one or more cache probes in a queued order.

The processing system may further be configured to maintain, in a shadow tag memory, state information for a plurality of cachelines in each private cache of the plurality of private caches, such that each private cache is associated with a corresponding one of the plurality of processing cores. To maintain the state information for the plurality of cachelines may include to maintain a respective bit vector for at least one private cache of the plurality of private caches, such that each of the respective bit vectors may include an indication of whether the associated private cache may contain stale data. The processing system may further be configured to set, responsive to receiving a cacheline store operation for an identified cacheline, one or more modification indicator bits for the identified cacheline to indicate that the identified cacheline may contain stale data. The modification indicator bits may be stored as part of state information in shadow tag entries corresponding to the plurality of cachelines. The processing system may further be configured to set, responsive to receiving a scope release operation from one processing core of the plurality of processing cores, one or more stale indicator bits to indicate that each private cache of the plurality of private caches may contain stale data.

The processing system may further be configured to broadcast the synchronization event to multiple memory channels of a shadow tag memory responsive to the synchronization event.

In certain embodiments, a shared cache may be communicatively coupled to a plurality of processing cores and to a plurality of private caches each associated with a corresponding processing core of the plurality of processing cores, such that the shared cache is configured to receive an indication of a write operation associated with a first private cache of the plurality of private caches, the first private cache associated with a first processing core of the plurality of processing cores; and to delay notification of the write operation to any private cache of the plurality of private caches until a synchronization event occurs.

The synchronization event may include a scope acquire operation received from the first processing core.

The shared cache may further be configured to provide, responsive to the synchronization event and for transmission to one or more cachelines of a plurality of cachelines in each of at least one of the private caches, one or more cache probes regarding the write operation.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

Figure 1:
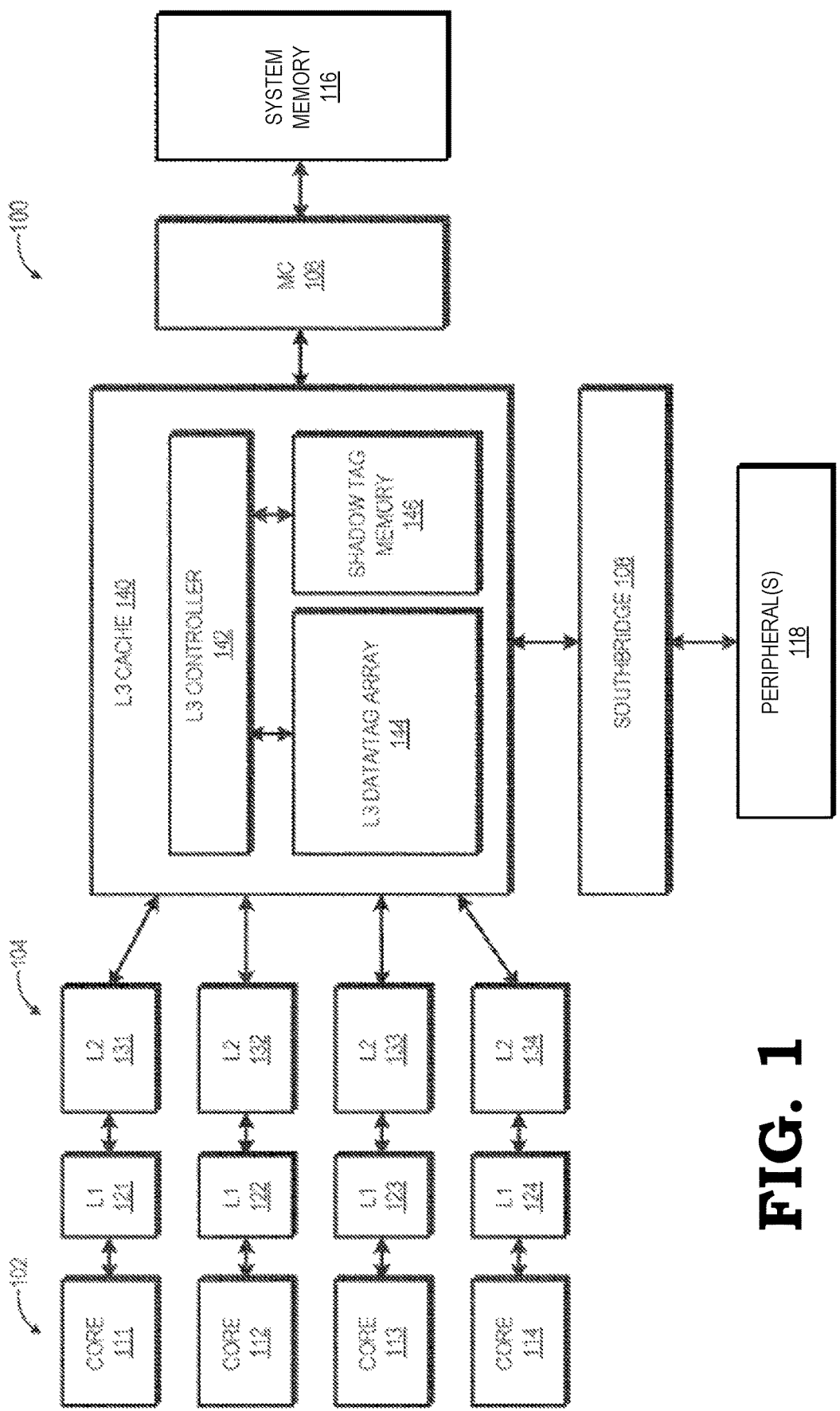
FIG. 1 is a block diagram of a processing system utilizing a shadow tag memory in accordance with some embodiments.

In scope-based synchronization schemes such as those employed in multi-core central processing units (CPUs) and graphics processing units (GPUs), there are generally two aspects to maintaining coherence for multiple private level 2 (L2) caches (in which each of multiple L2 caches is typically associated with a separate processing core). First, making write operations globally visible at specific points of coherence (points at which data in a relevant cache is to be visible to all actors in the system also termed synchronization boundaries); second, invalidating stale data in the private L2 caches at appropriate synchronization boundaries. As part of such synchronization schemes, cache probes (or simply "probes") are typically used to obtain cached data, inquire as to a state of cached data, change a state of cached data, or otherwise manipulate the cached data by potentially invalidating the cacheline from one or more caches. Previous implementations for handling cache coherence typically involve propagating such write operations via cache probes by writing through or writing back dirty lines to a point of coherence e.g., a shadow tag memory configured to maintain state information for each cacheline of one or more of the private L2 caches. In such implementations, upon receiving a write operation at the point of coherence, all sharers of a cacheline are sent a probe to invalidate their respective private copies of the cacheline. As used herein, a "dirty" cacheline is one that stores a more recent version of data than that in the shared cache (e.g., the R/W cacheline was modified) and is to be written out to update the system. A "stale" cacheline is when the cacheline stores an outdated version of the data and is to be updated (e.g., the source was modified since the cached copy was read and last updated). Thus, such cache coherence schemes involve sending cache probes to invalidate data as soon as a write operation is received, which in many cases results in cachelines being invalidated earlier than necessary (e.g., whenever processing threads encounter a synchronization boundary).

However, in various circumstances such cache probes do not need to be sent following every write operation, and instead can be prevented from transmission to other private L2 caches until a synchronization event occurs across a synchronization boundary. Embodiments of techniques described herein instead employ a relaxed invalidation scheme for cache coherence, such as by leveraging shadow tags to group cache probes together until such a synchronization event occurs at which point the delayed probes are sent to those processing cores participating in the synchronization of the relevant data. Thus, cache probes are held in abeyance (such as by shadow tag memory) until a cacheline is the target of an access request across a synchronization boundary, such as a shadow tag or other point of coherence.

In particular, in certain embodiments one or more cache probes are prevented from transmission to the private L2 caches until a scope acquire operation is received from one of the processing cores associated with one of the private L2 caches. Responsive to receiving such a scope acquire operation, the shared cache broadcasts the scope acquire operation to all downstream private caches, executes the scope acquire operation, and releases the queued probes to their respective destination cachelines in the private L2 caches. As used herein, such scope acquire operations may be directed to any hardware- or software-defined scope. As non-limiting examples of such scopes, each instruction or operation utilizing memory of the system may be associated with a defined scope specific to the entire system, a specified device (e.g., an entire multicore processor, including all of its separate cores and compute units), an application, a process thread, a wave, or other indicated granularity.

In at least some embodiments, a shared cache may facilitate this delayed handling of cache probes by maintaining a cache-specific bit vector for each of multiple private L2 caches to indicate whether a particular private L2 cache may contain stale data (e.g., a 'probe pending' bit), as well as a modification bit for each shadow tag entry in the shared cache (e.g., a 'cacheline modified' bit). The bit vector may be utilized in some embodiments to facilitate additional operations of the shared cache with respect to queued and/or otherwise delayed transmission of cache probes. For example, responsive to receiving a scope release operation, the shared cache may broadcast the scope release operation to all of the upstream private caches, and update the maintained bit vector for each of the other private L2 caches (those other than the private L2 cache associated with a processing core that initiated the scope acquire operation) to indicate that each of those other private L2 caches may now contain stale data. Similarly, upon receiving a cacheline store operation for an identified cacheline, the shared cache may set one or more modified indicator bits in the shadow tag entry for the identified cacheline in each of the private caches storing that identified cacheline.

In contrast to cache coherence schemes in which probes are sent to invalidate data as soon as the write operation is received, in which cachelines may be invalidated earlier than necessary in many cases, embodiments of techniques described herein may enable cachelines to stay valid for longer within each private L2 cache, as such cachelines are typically only invalidated once a synchronization event (e.g., a scope acquire or scope release event) occurs across a synchronization boundary. This longer duration for non-invalidated cachelines may result in various performance advantages, such as reduced power usage, reduced processor cycles, etc. In addition, if a particular private L2 cache is not participating in the synchronization event, then cachelines that are shared in the private L2 cache need not be invalidated as a result of that synchronization event.

Embodiments of techniques described herein include a processing system utilizing a shadow tag memory to provide for efficient caching operations. The processing system implements one or more compute complexes, each compute complex having multiple processing cores and a cache hierarchy that has two or more levels of caches. Each processing core is associated with one or more levels of caches that are private to a corresponding core (hereinafter, the "private caches"). In certain embodiments, the processing system further implements a cache at another level and which is shared among the processing cores of the compute complex (hereinafter, the "shared cache"). The controller of the shared cache maintains address and state information for cachelines of the private caches in a shadow tag memory. This state information may include, for example, coherency information for the cacheline for each of the private caches, as well as information regarding prior history of the cacheline at the private caches. Such coherency information may include, for example, an indicator of a coherency state from a set of coherency states that in at least some embodiments may be a superset of the set of coherency states implemented by the private caches.

FIG. 1 illustrates a processing system 100 utilizing shadow tag memory in accordance with at least some embodiments. In the depicted example, the processing system 100 includes a compute complex 102, a cache hierarchy 104, a memory controller 106, and a southbridge 108. The compute complex 102 includes a plurality of processing cores, such as the four processing cores 111, 112, 113, 114 depicted in this example. The processing cores comprise, for example, central processing unit (CPU) cores, graphics processing unit (GPU) cores, digital signal processor (DSP) cores, or a combination thereof. It will be appreciated that the number of processing cores of the compute complex 102 may be fewer or more than four.

The memory controller 106 operates as the interface between the cache hierarchy 104 and a system memory 116. Thus, data to be cached in the cache hierarchy 104 typically is manipulated as blocks of data referred to as "cachelines", and which are addressed or otherwise located in a memory hierarchy using a physical address of system memory 116. Cachelines are accessed from the system memory 116 by the memory controller 106 in response to memory requests from the cache hierarchy 104. Likewise, when a cacheline containing modified data is evicted from the cache hierarchy 104 and thus needs to be updated in the system memory 116, the memory controller 106 manages this write-back process. The southbridge 108 operates as the interface between the cache hierarchy 104, the memory controller 106, and one or more peripherals 118 of the processing system 100 (e.g., network interfaces, keyboards, mice, displays, and other input/output devices).

In the depicted embodiment, the cache hierarchy 104 includes two or more levels of caches. In the illustrated example, the cache hierarchy 104 includes three cache levels: level 1 (L1); level 2 (L2), and level 3 (L3). For L1, the compute complex 102 implements one or more small private caches for each processing core (and/or for each of one or more compute units within that processing core), which are depicted as L1 caches 121, 122, 123, 124, each associated with a corresponding one of processing cores 111-114 as depicted in FIG. 1. It will be appreciated that although for ease of illustration certain operations are described herein with respect to private L2 caches and a shared L3 cache, other embodiments may utilize such operations via other levels and types of hierarchical private and shared cache structures.

For L2, the compute complex 102 implements larger private caches for each processing core, which are depicted as L2 caches 131, 132, 133, 134 corresponding to processing cores 111-114, respectively, as also illustrated in FIG. 1. Each of the L2 caches 131-134 is private to its corresponding processing core, but the cache hierarchy 104 operates to maintain coherency between the L2 caches 131-134. The L2 caches 131-134 can be direct-mapped or an n-way set associative cache in some embodiments.

In the depicted embodiment, the cache hierarchy 104 includes an L3 cache 140 that is shared by the processing cores of the compute complex 102, and thus shared by at least the L2 caches 131-134. The L3 cache 140 implements an L3 cache controller 142, an L3 data array comprising a plurality of indexes and a plurality of corresponding ways, each way to store a corresponding cacheline at the corresponding index, and an L3 tag array to store the tag information associated with each index/way. The L3 data array and L3 tag array are collectively illustrated, and referred to herein, as L3 data/tag array 144.

The L3 cache 140 further includes a shadow tag memory 146 to store address and state information for cachelines of the L2 caches 131-134 (that is, to store "shadow tags" representative of the tag information of the L2 caches 131-134). To this end, the shadow tag memory 146 is implemented as a cache, array, table, latches, flops, or other storage configuration so as to include shadow tag entries hierarchically arranged as a plurality of "banks", a plurality of indices, and a plurality of ways. That is, each entry in the shadow tag memory 146 corresponds to a particular bank, index, and way combination. Each shadow tag entry in the shadow tag memory 146 tracks information for a corresponding cacheline present in one of the L2 caches 131-134. The information stored at a shadow tag entry for the corresponding cacheline includes, for example, the physical address (or portion thereof) of the cacheline as well as the state of the cacheline at the L2 cache. Each bank contains a plurality of indices and ways and represents the shadow tag entries used to track the cachelines present in one of the L2 caches. Thus, for the example of FIG. 1, the shadow tag memory 146 includes four "banks," one for each of the four L2 caches 131-134.

In certain embodiments, the shared L3 cache 140 is able to filter probes sent to the private caches based on lines present in the shadow tag memory 146. If a probed line is not present in the shadow tag memory, the probe does not need to be sent to the private cache and thus may be filtered out by the shared cache. For example, in circumstances in which a write operation is received (along with a commensurate cache probe) for a cacheline that is subsequently evicted from a private L2 cache, the queued cache probe associated with that write operation may be discarded entirely, avoiding the time and resources associated with sending the probe. Such probe filtering may reduce probe traffic to the private caches within the compute complex for probes that originate from within the compute complex as well as those transmitted between the compute complex and the system at large. In some embodiments, the shadow tag memory may also track the state of cachelines of the private caches with higher granularity, as well as process a cacheline fill request from the private cache level and its associated cacheline victim request more efficiently.

Figure 2:
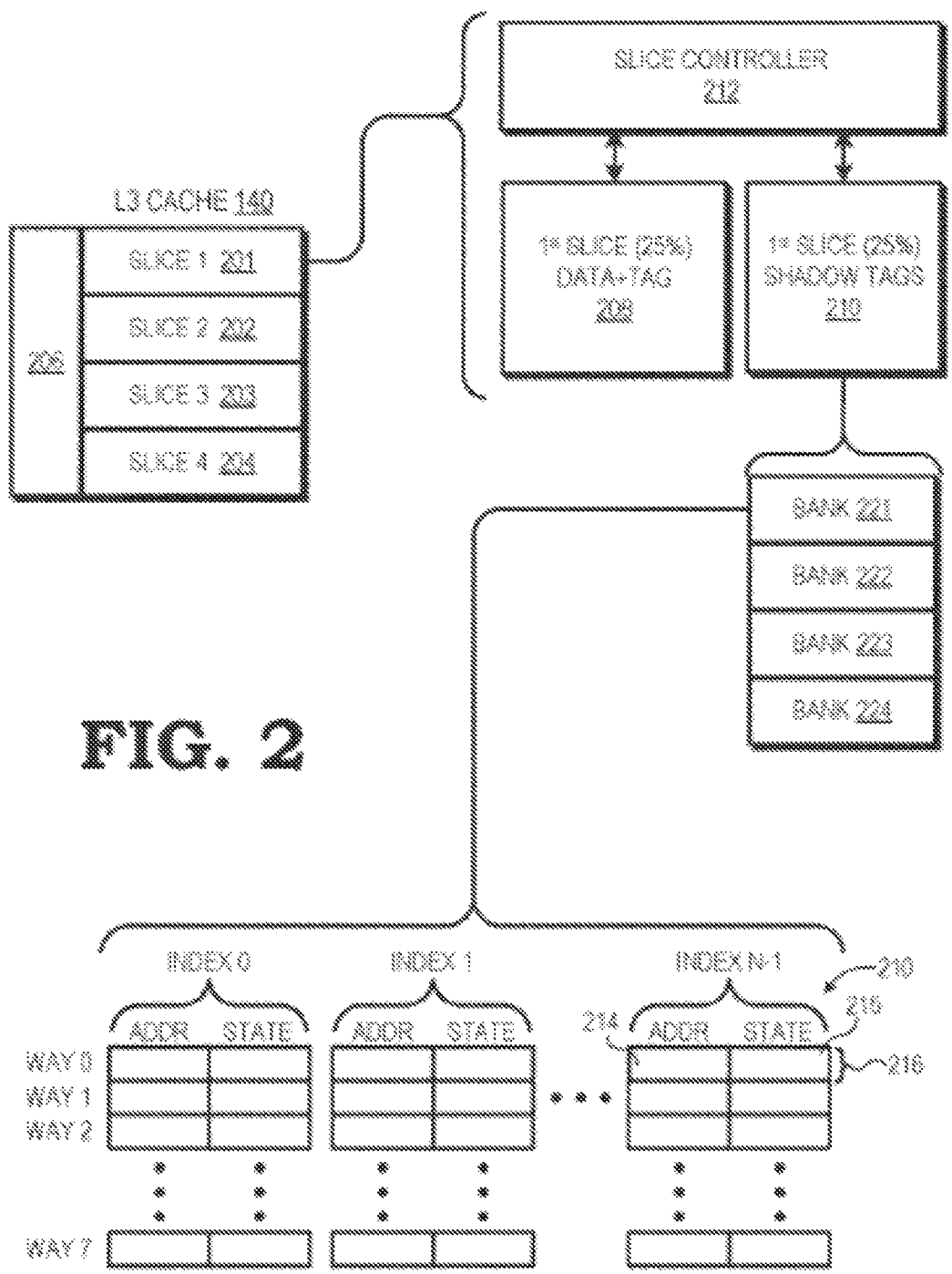
FIG. 2 is a block diagram of a shared cache with a shadow tag memory for storing state information for multiple private caches in accordance with some embodiments.

FIG. 2 depicts an example implementation of the L3 cache 140 in accordance with some embodiments. In the depicted implementation, the L3 cache 140 is segmented into a plurality of "slices", with the illustrated example having four slices 201, 202, 203, 204 (also denoted as slices 1-4), and routing logic 206 to route communications to and from the respective slices based on how the address associated with each communication is located within the slices 1-4. Each slice represents a corresponding "slice" of the distribution of addresses used by the L2 caches 131-134. Each slice also represents corresponding "slice" of the shadow tag memory 146. Thus, as there are four slices in this example, each of slices 201-204 stores a corresponding 25% portion of the address space of the L2 caches 131-134 and a corresponding 25% portion of the entries of the shadow tag memory 146. To this end, as shown by the detailed view of slice 201, each slice includes an L3 data/tag slice 208, a shadow tag slice 210, and a slice controller 212. For slice 201, the L3 data/tag slice 208 has data and tag array entries for the first 25% of the L2 cache address range, whereas for slice 202 this is for the second 25% of the L2 cache address range, and so on. Similarly, for slice 201 the shadow tag slice 210 includes the first 25% of the indices of the shadow tag memory 146, for slice 202 the shadow tag slice 210 includes the second 25% of the indices of the shadow tag memory 146, and so on.

FIG. 2 also depicts an example arrangement of the shadow tag memory 146 in further detail. As noted, the shadow tag memory 146 is stored as a set of shadow tag slices 210, each having a corresponding portion of the overall address range that is associated with the shadow tag memory 146. Thus, each shadow tag slice 210 includes a plurality of banks, indices, and ways. The number of banks in each shadow tag slice 210 corresponds to the number of L2 caches. Thus, because there are four L2 caches 131-134 in the example of FIG. 1, each shadow tag slice 210 includes four banks 221, 222, 223, 224, each respectively associated with one of the L2 caches 131, 132, 133, and 134. The associativity (that is, the number of ways) of a bank is the same as the associativity of the L2 cache associated with that bank. For example, if the L2 cache is eight-way associative, then each bank of the shadow tag memory 146 is also eight-way associative, that is, has eight ways. Conversely, if the L2 cache is direct mapped, then each bank of shadow tag memory 146 is also direct mapped; such that each bank is effectively a one-way set-associative cache. A particular combination of index and way in a given bank represents a shadow tag entry 216 that tracks a corresponding cacheline that is present in L2 cache. Each entry of the shadow tag memory 146 has an address field 214 to store at least a portion of an address (typically the upper bits of the physical address) of the cacheline associated with the entry 216 and a state field 215 to store state information for the cacheline.

In at least some embodiments, the address information of address field 214 and state information of state field 215 (including coherency state information) stored in a corresponding entry 216 of the shadow tag memory 146 for a cacheline of an L2 cache may reflect at least a subset of the tag information stored in the tag array of the L2 cache for that cacheline, and thus "shadows" the L2 cache's tag for this cacheline. In such embodiments, the state information in the shadow tag memory 146 of the L3 cache 140 may be viewed as "shadow tags" of the counterpart cacheline tags in the L2 caches 131-134. Thus, in the depicted embodiment the state information stored in the shadow tag entry 216 associated with a particular cacheline at a particular core/L2 cache includes not only a copy of the tag portion of the physical address of the cacheline at this L2 cache, but also coherency state information for the cacheline. In certain embodiments, such state information may further include allocation information to facilitate handling of eviction of the cacheline from the relevant private L2 cache.

It will be appreciated that in various embodiments, a cache coherence and synchronization scheme employed using various techniques described herein may be implemented using hardware, software, or some combination thereof. As one non-limiting example, in certain embodiments a hardware controller for one or more caches in a system may receive indications of one or more synchronization scopes defined via one or more software applications for various operations of the system, and may enforce data coherence via the synchronization scheme based on such software-defined scopes. Thus, in certain embodiments, cache coherence may be managed by executable instructions that form at least part of one or more software programs (e.g., application software, operating system software, firmware, or other software program) executing on one or more hardware computer systems.

Figure 3:
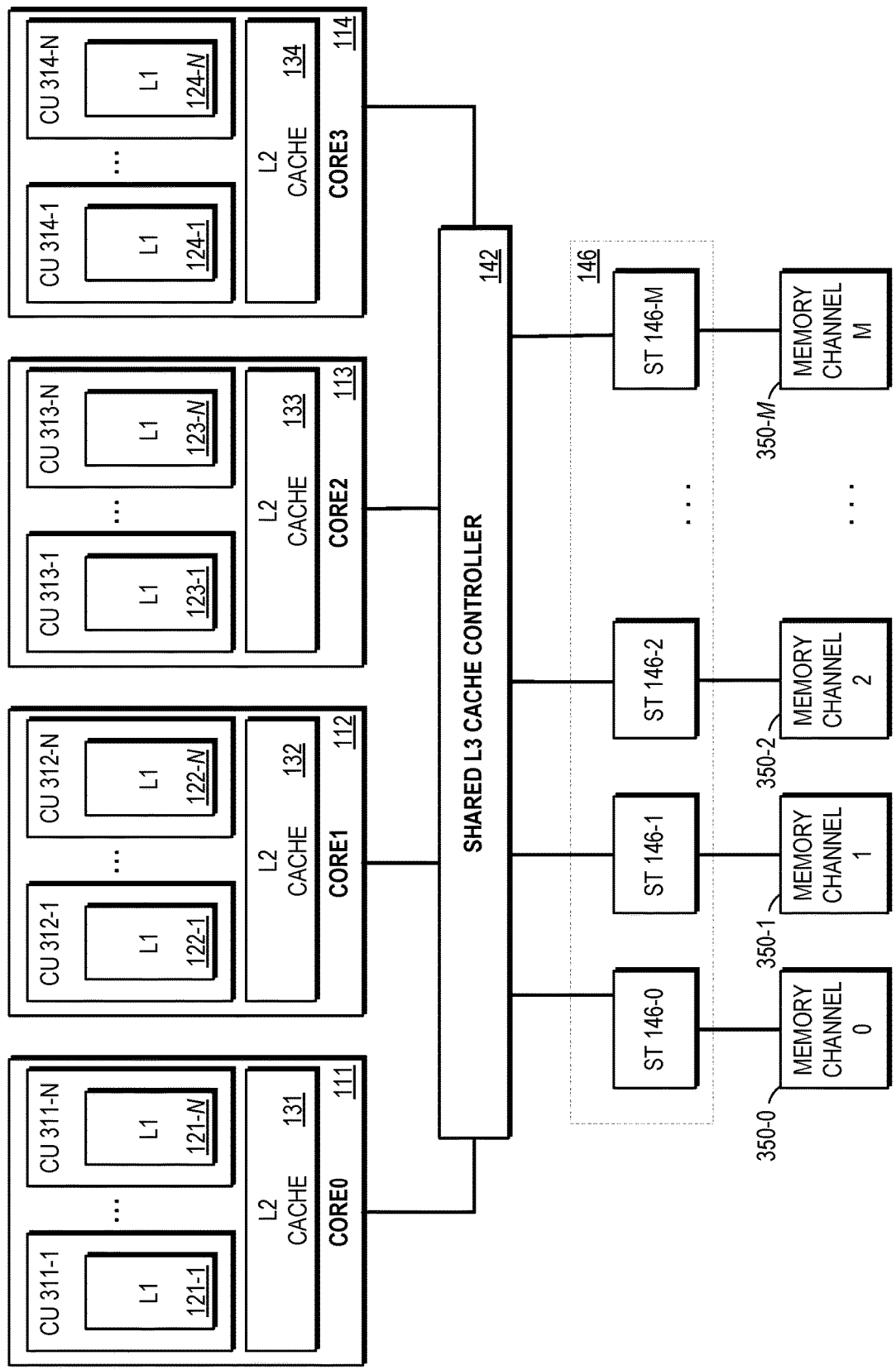
FIG. 3 is a block diagram of hierarchical multilevel cache system utilizing a shadow tag memory in accordance with some embodiments.

FIG. 3 is a block diagram of a hierarchical cache system 300 utilizing a shadow tag memory in accordance with one or more embodiments. In particular, the hierarchical cache system 300 presents an alternative view of the cache hierarchy described above with respect to processing system 100 of FIG. 1 and elements of the shared L3 cache 140 of FIGS. 1 and 2. The four processing cores 111, 112, 113, 114 each include N compute units (e.g., processing core 111 includes compute units 311-1 through 311-N, processing core 112 includes compute units 312-1 through 312-N, and so on), with each compute unit having its own private L1 cache (e.g., compute unit 311-1 having L1 cache 121-1, compute unit 311-N having L1 cache 121-N, and so on).

As described with respect to processing system 100 of FIG. 1, each of the processing cores 111, 112, 113, 114 is further associated with its own private L2 cache (131, 132, 133, and 134, respectively), and is communicatively coupled to the shared L3 cache 140, depicted in the embodiment of FIG. 3 as a respective connection to the shared L3 cache controller 142. The shared L3 cache controller 142 is communicatively coupled to each of M shadow tags (Shadow Tag 146-1 . . . 146-1) in shadow tag memory 146, each symbolically represented as having its own dedicated memory channel 350-0, 350-1, 350-2, and 350-M, respectively. As described elsewhere herein, such memory channels may be utilized in certain embodiments to, as one non-limiting example, broadcast one or more operations to multiple memory channels of the shadow tag memory 146.

Figure 4:
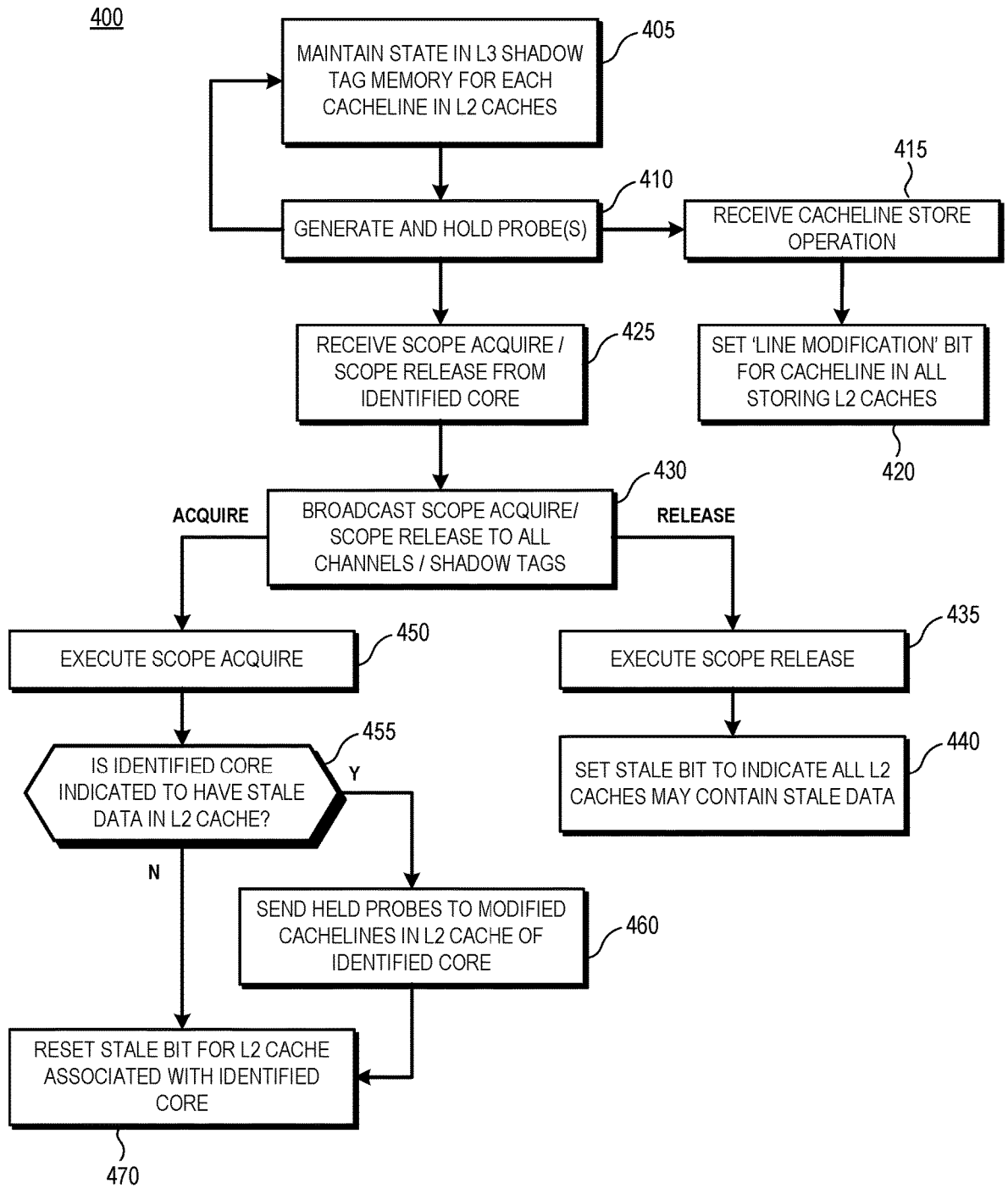
FIG. 4 is a block diagram illustrating an overview of an operational routine of a shared cache controller in accordance with one or more embodiments.

FIG. 4 is a block diagram illustrating an overview of an operational routine 400 of a controller of a shared cache (such as the shared L3 cache controller 142 of FIG. 1) in a hierarchical cache system in accordance with one or more embodiments. The routine begins at block 405, in which the shared cache controller maintains state information in shadow tag memory for each cacheline in multiple private L2 caches. In certain embodiments, maintaining such state information may include maintaining a cache-specific bit vector for each of the private L2 caches to indicate whether the associated private L2 cache may contain stale data. In at least the depicted embodiment, the respective bit vector may include a modification bit for each tag entry in the shadow tag memory to indicate, for example, that a cache probe has been received for the cacheline associated with a tag entry. In certain embodiments, such modification bits may be included in state information in shadow tag entries corresponding to the plurality of cachelines (e.g., as part of state field 215 from FIG. 2). In other embodiments, the respective bit vector may be stored contiguously, or in some other serial or distributed manner.

At block 410, the routine generates one or more cache probes and prevents them from being transmitted to their respective destination cachelines, holding them in abeyance until released. In certain embodiments, this delaying the transmission of the cache probes includes queuing the probes for later transmission.

At block 415, the shared cache controller receives a cacheline store operation for an identified cacheline in one or more of the private L2 caches. Responsive to receiving the cacheline store operation, the routine proceeds to block 420 and sets one or more cacheline modification bits of the maintained bit vector for the identified cacheline in each private L2 cache in which the identified cacheline is stored, such as to indicate that the identified cacheline may contain stale data.

At block 425, the shared cache controller receives a scope acquire or scope release operation from an indicated processing core. In the depicted embodiment, responsive to receiving the operation the routine proceeds to block 430, in which the shared cache controller broadcasts the scope acquire or scope release operation to all memory channels and shadow tags. The routine then proceeds to block 435 if the operation received was a scope release operation, or to block 450 if the operation received was a scope acquire operation.

At block 435, the shared cache controller executes the scope release operation received from the identified processing core and proceeds to block 440. At block 440, the shared cache controller sets one or more stale indicator bits of the maintained bit vector to indicate that each of the multiple private L2 caches may now contain stale data.

At block 450, the shared cache controller executes the scope acquire operation received from the identified processing core, and proceeds to block 455. At block 455, the shared cache controller determines whether the identified processing core is indicated to have stale data in its associated private L2 cache (such as if a previously executed scope release operation has been performed, causing the shared cache controller to set stale indicator bits of the associated bit vector, or to indicate possibly stale data within the associated private L2 cache in some other manner). If the identified processing core is indicated to have stale data in its associated private L2 cache, then the routine proceeds to block 460, in which the shared cache controller releases for transmission all cache probes currently held for any cachelines modified in the private L2 cache associated with the identified processing core. If delaying the transmission of the cache probes included queuing the received cache probes for later transmission in an order in which they were received, then releasing the cache probes for transmission includes releasing the probes in the queued order.

After the held cache probes are released for transmission in block 460, or if it was determined in block 455 that the identified processing core is not indicated to have stale data in its associated private L2 cache, the routine then proceeds to block 470, in which the shared cache controller resets the stale bits for cachelines of the private L2 cache associated with the identified processing core (the processing core from which the scope acquire operation was received).

Following block 420, 440, or 470, the routine returns to block 405, and continues to maintain state information in shadow tag memory for each cacheline in the multiple private L2 caches.

In some embodiments, the apparatus and techniques described above are implemented in a system including one or more integrated circuit (IC) devices (also referred to as integrated circuit packages or microchips), such as the processing system described above with reference to FIGS. 1-4. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   generating one or more notifications of a write operation associated with a first private cache of a plurality of private caches responsive to the write operation, the first private cache being associated with one processing core of a plurality of processing cores;
   delaying transmission of the one or more notifications of the write operation to any private caches of the plurality of private caches until a synchronization event occurs; and
   responsive to the synchronization event, providing the one or more notifications to at least one of the private caches.

2. The method of claim 1, wherein delaying transmission of the one or more notifications until the synchronization event occurs includes delaying the transmission until a scope acquire operation is received from the one processing core.

3. The method of claim 1, further comprising:
   responsive to receiving the synchronization event, resetting a stale indicator bit for the first private cache.

4. The method of claim 1, wherein providing the one or more notifications includes generating one or more cache probes in response to the synchronization event.

5. The method of claim 1, wherein generating the one or more notifications includes generating one or more cache probes in response to the write operation.

6. The method of claim 1, wherein providing the one or more notifications includes providing the one or more notifications for transmission to the one or more cache lines in a queued order.

7. The method of claim 1, further comprising:
   maintaining, in a shadow tag memory, state information for a plurality of cachelines in each private cache of the plurality of private caches, each private cache being associated with a corresponding one of the plurality of processing cores.

8. The method of claim 7, wherein maintaining the state information for the plurality of cachelines includes maintaining a respective bit vector for at least one private cache of the plurality of private caches, each of the respective bit vectors including an indication of whether the associated private cache may contain stale data.

9. The method of claim 8, further comprising:
   responsive to receiving a cacheline store operation for an identified cacheline, setting one or more modification indicator bits for the identified cacheline to indicate that the identified cacheline may contain stale data.

10. The method of claim 9, wherein the one or more modification indicator bits are stored as part of state information in shadow tag entries corresponding to the plurality of cachelines.

11. The method of claim 9, further comprising:
    responsive to receiving a scope release operation from one processing core of the plurality of processing cores, setting one or more stale indicator bits to indicate that each private cache of the plurality of private caches may contain stale data.

12. The method of claim 1 further comprising:
    responsive to the synchronization event, broadcasting the synchronization event to multiple memory channels of a shadow tag memory.

13. The method of claim 1, wherein providing the one or more notifications to each of at least one of the private caches includes providing the one or more notifications to one or more cachelines of a plurality of cachelines in each of the at least one private caches.

14. A processing system, comprising:
    a plurality of processing cores; and
    a plurality of private caches, each private cache associated with a corresponding processing core of the plurality of processing cores;
    wherein the processing system is configured to:
      generate one or more notifications of a write operation associated with a first private cache of the plurality of private caches responsive to the write operation, the first private cache associated with one processing core of the plurality of processing cores;
      delay transmission of the one or more notifications of the write operation to any private cache of the plurality of private caches until a synchronization event occurs; and
      responsive to the synchronization event, provide the one or more notifications at least one of the private caches.

15. The processing system of claim 14, wherein the synchronization event comprises a scope acquire operation received from the one processing core.

16. The processing system of claim 15, wherein the processing system is further configured to, responsive to receiving the scope acquire operation, reset a stale indicator bit for the first private cache.

17. The processing system of claim 14, wherein to provide the one or more notifications includes to generate one or more cache probes in response to the synchronization event.

18. The processing system of claim 14, wherein to generate the one or more notifications includes to generate one or more cache probes in response to the write operation.

19. The processing system of claim 14, wherein to provide the one or more notifications includes to provide the one or more notifications for transmission to the at least one private cache in a queued order.

20. The processing system of claim 14, wherein the processing system is further configured to maintain, in a shadow tag memory, state information for a plurality of cachelines in each private cache of the plurality of private caches, and wherein each private cache is associated with a corresponding one of the plurality of processing cores.

21. The processing system of claim 20, wherein to maintain the state information for the plurality of cachelines includes to maintain a respective bit vector for at least one private cache of the plurality of private caches, and wherein each of the respective bit vectors includes an indication of whether the associated private cache may contain stale data.

22. The processing system of claim 21, wherein the processing system is further configured to set, responsive to receiving a cacheline store operation for an identified cacheline, one or more modification indicator bits for the identified cacheline to indicate that the identified cacheline may contain stale data.

23. The processing system of claim 22, wherein the modification indicator bits are stored as part of state information in shadow tag entries corresponding to the plurality of cachelines.

24. The processing system of claim 22, wherein the processing system is further configured to set, responsive to receiving a scope release operation from one processing core of the plurality of processing cores, one or more stale indicator bits to indicate that each private cache of the plurality of private caches may contain stale data.

25. The processing system of claim 14, wherein the processing system is further configured to broadcast the synchronization event to multiple memory channels of a shadow tag memory responsive to the synchronization event.

26. The processing system of claim 14, wherein to provide the one or more notifications to at least one of the private caches comprises to provide the one or more notifications to one or more cachelines of a plurality of cachelines in the at least one private cache.

27. A shared cache communicatively coupled to a plurality of processing cores and to a plurality of private caches each associated with a corresponding processing core of the plurality of processing cores, the shared cache configured to:
generate one or more notifications of a write operation associated with a first private cache of the plurality of private caches responsive to the write operation, the first private cache associated with a first processing core of the plurality of processing cores;
delay transmission of the one or more notifications of the write operation to any private cache of the plurality of private caches until a synchronization event occurs; and
provide, responsive to the synchronization event, the one or more notifications to at least one of the private caches.

28. The shared cache of claim 27, wherein the synchronization event comprises a scope acquire operation received from the first processing core.

* * * * *